US007860765B2

(12) United States Patent  
Bouchard

(10) Patent No.: US 7,860,765 B2  
(45) Date of Patent: Dec. 28, 2010

(54) SYSTEM AND METHOD FOR ASSESSING RISKS OF A SOFTWARE SOLUTION FOR A CUSTOMER

(75) Inventor: Peter D. Bouchard, Wolcott, CT (US)

(73) Assignee: International Business Machines Corporation, Armonk, NY (US)

( * ) Notice: Subject to any disclaimer, the term of this patent is extended or adjusted under 35 U.S.C. 154(b) by 683 days.

(21) Appl. No.: 11/221,052

(22) Filed: Sep. 7, 2005

(65) Prior Publication Data

US 2007/0051791 A1    Mar. 8, 2007

(51) Int. Cl.
*G06Q 40/00* (2006.01)
(52) U.S. Cl. .......................................... 705/35; 705/28
(58) Field of Classification Search ................. 705/35, 705/37
See application file for complete search history.

(56) References Cited

U.S. PATENT DOCUMENTS

| | | | | |
|---|---|---|---|---|
| 6,151,582 | A  * | 11/2000 | Huang et al. | ................... 705/8 |
| 6,591,232 | B1   |  7/2003 | Kassapoglou | |
| 7,082,384 | B2 * |  7/2006 | Sasaki et al. | ............... 702/184 |
| 7,313,531 | B2 * | 12/2007 | Chappel et al. | ................ 705/7 |
| 2003/0195828 | A1 | 10/2003 | Honarvar et al. | |
| 2005/0114186 | A1 * |  5/2005 | Heinrich | ........................ 705/7 |

OTHER PUBLICATIONS

Neumann, Peter G. et al., "Risks to the Public in Computers and Related Systems," ACM Software Engineering Notes, May 2004, pp. 7-14, vol. 29, No. 4.
Vitharana, Padmal, "Risks and Challenges of Component-Based Software Development," Communications of the ACM, Aug. 2003, pp. 67-72, vol. 46, No. 8.
Boehm, Barry, "Value-Based Software Engineering," ACM SIGSOFT Software Engineering Notes, Mar. 2003, pp. 1-12, vol. 28, No. 2.
Kontio, Jyrki et al., "Towards Better Software Projects and Contracts: Commitment Specifications in Software Development Projects," IEEE Publications No. 0-8186-8368-6/98, Jun. 1998, pp. 486-489.
Hollander, D.P., "Capitalizing on Components," Best's Review, Nov. 2002, pp. 98, vol. 103, No. 7.
Cross, G., "Tracking the Changing Face of System Development," Real-Time Magazine, No. 1, Jan.-Mar. 1996, pp. 10-12.

\* cited by examiner

*Primary Examiner*—Ella Colbert
*Assistant Examiner*—John A Anderson
(74) *Attorney, Agent, or Firm*—Douglas A. Lashmit; Hoffman Warnick LLC

(57) ABSTRACT

A risk assessment system and method. A system is provided that includes: a risk avoidance process for implementing a customer solution, wherein the risk avoidance process includes markers where a risk is assessed; a system for assigning a value to a first risk coefficient associated with a design related process at each of a plurality of the markers; a system for assigning a value to a second risk coefficient associated based on a customer ability at each of a plurality of the markers; and a system for assigning a value to a third risk coefficient for the entire risk avoidance process based on a customer history.

18 Claims, 4 Drawing Sheets

SYSTEM AND METHOD FOR ASSESSING RISKS OF A SOFTWARE SOLUTION FOR A CUSTOMER

BACKGROUND OF THE INVENTION

1. Technical Field

The present invention relates generally to evaluating risks, and more specifically relates to a system and method for producing an objective measure of the risk involved in the production and deployment of a software solution for a customer.

2. Related Art

As software based solutions ("solutions") become more and more complex, the ability to develop, deploy and maintain such solutions in a cost effective manner remains an ongoing challenge. Complex solutions often require complicated design architectures that involve different vendors and product brands. Once a sale is made, it is the developer's job to architect the solution and ensure that the solution can be deployed in a manner that is satisfactory for the customer. Oftentimes however, problems arise that slow down or delay the deployment of a solution, which results in increased costs and low customer satisfaction. The most severe problems, referred to as critical situations, significantly impact the ability to deliver the solution, drive down customer success rates, and ultimately tarnish the developer's reputation.

Critical situations often result from a process failure that occurs prior to the design of the solution, and often before the customer contract is signed. In many instances critical situations are caused by a poor initial assessment of the customer's capabilities for implementing a particular solution, sales organizations selling incorrect products into the solution space, sales organizations misinforming customers regarding product capabilities, etc. These failures are often followed by several other missteps throughout the software deployment process.

Process failures, both related to solution design and customer faults, often flow through multiple checkpoints en route to manifesting as a critical situation. As with any major catastrophe, theses failures represent a chain of events, which when left unchecked result in a critical situation. Accordingly, it is often the breakdown in process, or process failure, which drives the situation. Unfortunately, such process defects are often not discovered until late in the software delivery lifecycle, when discovering and rectifying the problems are significantly more expensive.

Accordingly, a need exists for a system and method for evaluating risks associated with a particular solution for a customer early in the development life cycle.

SUMMARY OF THE INVENTION

The present invention addresses the above-mentioned problems, as well as others, by providing a system and method for calculating an objective measure of risk associated with the production of a solution for a customer. In order to produce an objective measure, various metrics are evaluated. In particular, the invention seeks to provide a failure rate or overall level of risk by evaluating three distinct coefficients of risk, which include: (1) Risk of design ($r_d$), including the risk of use of products with known or suspected defects; (2) Risk of customer ability to implement ($r_c$); and (3) Risk due to designing for a customer that needs a lot of outside assistance or consistently has a history of problems with product implementation ($r_h$).

In a first aspect, the invention provides a risk assessment system, comprising: a risk avoidance process for implementing a customer solution, wherein the risk avoidance process includes markers where a risk is assessed; a system for assigning a value to a first risk coefficient associated with a design related process at each of a plurality of the markers; a system for assigning a value to a second risk coefficient associated based on a customer ability at each of a plurality of the markers; and a system for assigning a value to a third risk coefficient for the entire risk avoidance process based on a customer history.

In a second aspect, the invention provides a computer program product stored on a computer usable medium for performing a risk assessment of a customer solution, comprising: program code configured for representing a risk avoidance process for implementing a customer solution, wherein the risk avoidance process includes markers where a risk is assessed; program code configured for assigning a value to a first risk coefficient associated with a design related process at each of a plurality of the markers; program code configured for assigning a value to a second risk coefficient associated based on a customer ability at each of a plurality of the markers; and program code configured for assigning a value to a third risk coefficient for the entire risk avoidance process based on a customer history.

In a third aspect, the invention provides a method of performing a risk assessment of a customer solution, comprising: providing a risk avoidance process for implementing a customer solution, wherein the risk avoidance process includes markers where a risk is assessed; assigning a value to a first risk coefficient associated with a design related process at each of a plurality of the markers; assigning a value to a second risk coefficient associated based on a customer ability at each of a plurality of the markers; and assigning a value to a third risk coefficient for the entire risk avoidance process based on a customer history.

In a fourth aspect, the invention provides a method for deploying an application for performing a risk assessment of a customer solution, comprising: providing a computer infrastructure being operable to: provide a risk avoidance process for implementing a customer solution, wherein the risk avoidance process includes markers where a risk is assessed; assign a value to a first risk coefficient associated with a design related process at each of a plurality of the markers; assign a value to a second risk coefficient associated based on a customer ability at each of a plurality of the markers; and assign a value to a third risk coefficient for the entire risk avoidance process based on a customer history.

In a fifth aspect, the invention provides a computer software embodied in a propagated signal for implementing a system for performing risk assessment of a customer solution, the computer software comprising instructions to cause a computer to perform the following functions: provide a risk avoidance process for implementing a customer solution, wherein the risk avoidance process includes markers where a risk is assessed; assign a value to a first risk coefficient associated with a design related process at each of a plurality of the markers; assign a value to a second risk coefficient associated based on a customer ability at each of a plurality of the markers; and assign a value to a third risk coefficient for the entire risk avoidance process based on a customer history.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
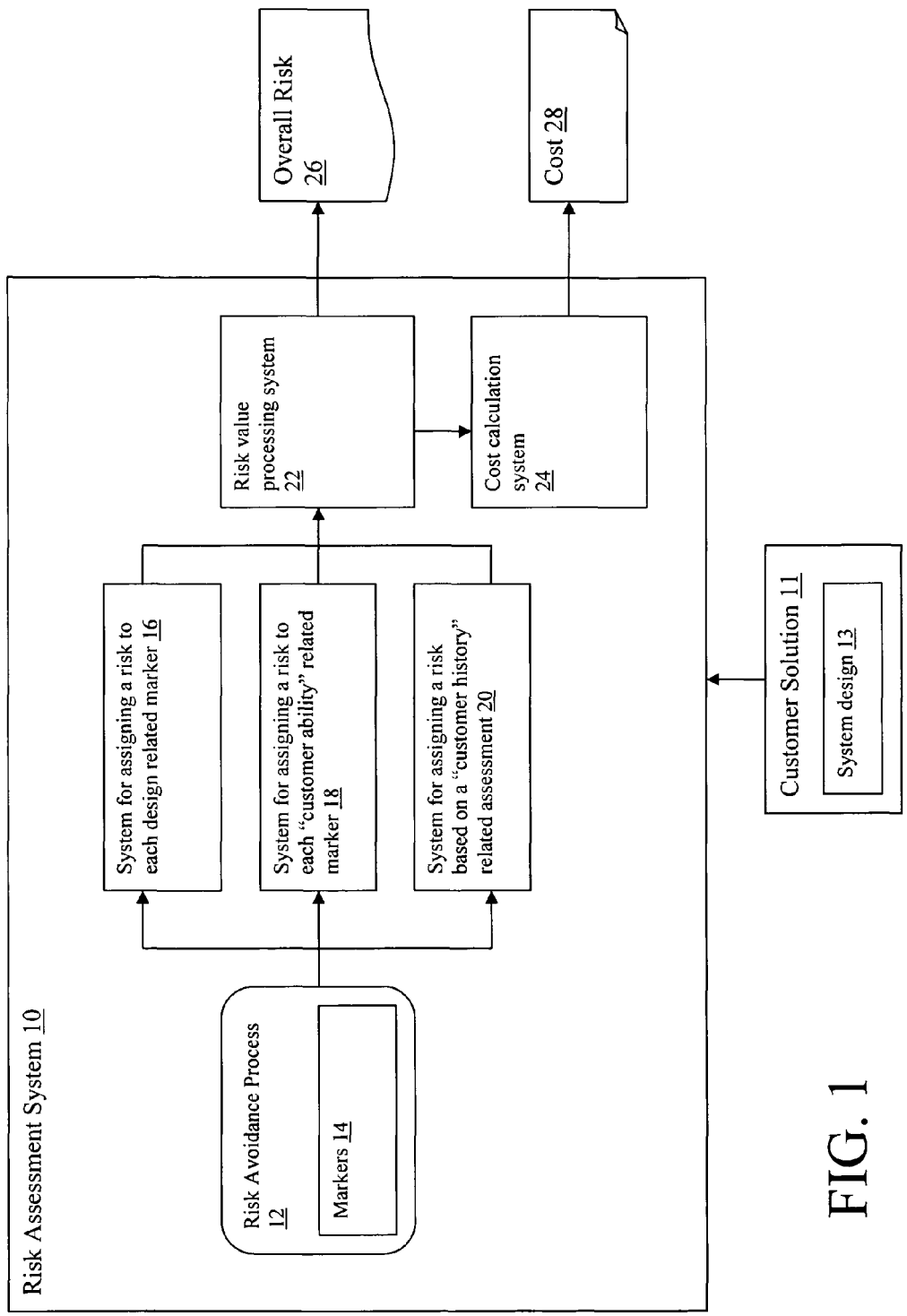
FIG. 1 depicts a risk assessment system in accordance with an embodiment of the present invention.

Referring now to the figures, FIG. 1 depicts a risk assessment system 10 that evaluates a risk avoidance process 12 for a customer solution 11 in order to generate an overall risk 26 and cost 28 for the customer solution 11. In this illustrative embodiment, the customer solution 11 comprises a software-based system design 13. However, it should be understood that the invention may be applied to any type of architected design or project. Risk avoidance process 12, described in further detail below, includes any number of markers 14, where risk values (or coefficients) can be evaluated for the customer solution 11.

In order to produce an objective measure that is proportional to the risk involved with the production of a customer solution 11, the metrics of this methodology require that risk values be determined at various points along the risk avoidance process 12. To achieve this, risk assessment system 10 considers three distinct categories of risk coefficients, including: (1) design related risks, including the risk of using products with known or suspected defects; (2) customer ability related risks, namely the customer's ability to implement the solution; and (3) customer history related risk, namely, the risk arising for a customer that needs a lot of outside assistance or consistently has a record of past problems with product implementation. Design related risks and customer ability related risks are evaluated at each of the markers 14 within the risk avoidance process 12. In the illustrative example provided herein, there are 23 markers 14. Customer history related risk is a single value determined for the entire risk avoidance process 12.

Accordingly, risk assessment system 10 includes a system 16 for capturing a set of "design related" risk coefficients $r_d[1 \ldots n]$ in the risk avoidance process 12; a system 18 for capturing a set of "customer ability" risk coefficients $r_c[1 \ldots m]$ in the risk avoidance process 12; and a system 20 for capturing a "customer history" risk coefficient $r_h$ for the entire risk avoidance process 12. The risk coefficients are then processed by a risk value processing system 22, which generates an overall risk 26. In addition, a cost 28 for the project is calculated by cost calculation system 24, which is based on the overall risk 26.

When each of the risk coefficients (i.e., risk values) are known, an overall risk 26 can be derived based on an equation that considers each of the coefficients, e.g.: $f(r) = r_d[1 \ldots n] \cdot r_c[1 \ldots m] \cdot r_h$. In one illustrative embodiment, the overall risk 26 may be predicted using a Weibull distribution of failure rates. Weibull distributions are well known in the art as providing a practical approach for performing failure predictability. The probability density function of Weibull distributed failures is give by the following equation:

$$f(t) = \frac{\beta}{\eta}\left(\frac{t-\gamma}{\eta}\right)^{\beta-1} e^{-\left(\frac{t-\gamma}{\eta}\right)^{\beta}}$$

Usually this distribution is used to predict failure rates over time. If however, the risk values r are substituted for time t, a predictor is provided that is based on the coefficient of risk of the proposed solution. A probability density function (PDF) based on risk instead of time results in a probability of failure not equated to mean time between failures, but instead, probability that a failure will occur during implementation or shortly after implementation due to risk. An additional benefit of using this PDF is its ability to mutate other well understood distributions such as Poisson and Standard Normal, thereby, better approximating real life situations.

In order to calculate the PDF, the cumulative probability is taken at the point of $r_n$. Cost calculation system 24 can then multiply that value by the cost of a typical "Critical Situation" or in order calculate a cost 28. More specifically, as noted, at each marker 14, two coefficients are generated based on a scale of 0-5 (0 being zero risk, 5 be absolute impending disaster). These are evaluations carried about Subject Matter Experts. The two coefficients are basically customer related risk, i.e., does the customer have the skill, and design related risk, i.e., is this design sound. Finally, a third risk factor is applied: historical risk, i.e., is this customer always in trouble.

Once the two sets of risk coefficients are collected (giving 46 values) and the historical risk is determined, an overall score is calculated (in any manner, e.g., as an average). Next, a probability distribution of failure is selected that represents the customer base. A normal distribution (i.e., bell curve) may be selected, but is not necessarily appropriate. For instance, if the company's customer base generally has a high level of satisfaction, the curve would tend to be skewed very much in favor of high percentages of no customer failure. However, a new and experimental piece of technology being tried for the very first time will have a curve that is skewed towards failure. For clarity's sake, understand that these curves represent probability of failure, not probability of success. Thus, even if the overall coefficient is calculated as a 1, there is still a high risk of failure.

After the coefficients or risk are determined, any type of probability distribution functions (PDF) could be utilized. The Weibull distribution is one illustrative example that works well since it is commonly used in engineering circles to analyze "weakest links." The PDF then provides a probability of failure. Multiplying the probability of failure with the cost of the overall systems, gives you the dollar exposure.

The following tables provide an illustrative example for collecting the risk coefficients. At each of the markers 14 involving a design risk, a design risk value $r_d$ is scored by a subject matter expert (SME) base on the guidelines laid out in Table 1.

TABLE 1

| Coefficient of Risk | Level of risk assumed | Explanation |
| --- | --- | --- |
| 0 | There is no risk in the performance of this task | There is a widely held understanding of the process and or technology that is be used |
| 1 | Low risk in the performance of this task | There is a widely held understanding of the process and or technology that is be used however this risk can be mitigated through the use of best practices |
| 2 | Moderate risk in the performance of this task | There is a widely held understanding of the process and or technology that is be used. This risk should be monitored for variation of the risk throughout the project life cycle. |
| 3 | Medium risk in the performance of this task | There is a widely held understanding of the process and or technology that is be used. This technology or process is currently on the PTE list as a mandatory review. |
| 4 | High risk in the performance of this task | There is not a widely held understanding of the process and or technology that is be used. This process or technology is known to be problematic and/or has known quality issues. |
| 5 | Exceptionally high risk in the performance of this task | There is no known instance of this design from previous customer engagements. There are potentially significant design, product, or deployment issues with products in this design or the design in general |

Similarly, at each of the markers 14 involving a customer ability related risk, a value $r_c$ is determined. Many customers do not have the skill set to efficiently install, implement, and run every solution. Other customers are very adept at implementing such solutions, even those that are very complex and not well understood. Accordingly, an objective measure is needed to evaluate a customer's ability to deploy solutions. Additionally, there are several factors that play into the customer's ability to deploy a solution. The Subject Matter Expert (SME) must take several of these into consideration when evaluating the customer's ability to deploy. Among these considerations, but not limited to, are the following factors:

(1) Skills—Does the customer have the skills already? Will the customer gain the skills through enablement prior to starting any projects employing this design (though this is better than not having a skills enhancement plan, it still raises the possibility for risk)?

(2) Is the customer operationally prepared to implement the solution?

(3) Does the customer have the necessary management controls in place to make this solution tenable? Examples include, e.g., Code asset management; Turnover procedures and processes; Quality Control and Quality Assurance; Security, especially inside access control; Operations management processes; Recovery procedures;

(4) Has the customer ever implemented something similar in scope and complexity to what is being designed? What was the experience? Were services involved?

These are only some of the many factors that the Architect(s) and SMEs must take into account when considering the level of risk that the customer capability presents.

Table 2 gives guidance on assigning a second coefficient of risk for customer ability related risks $r_c$.

TABLE 2

| Customer Coefficient of Risk | Level of risk assumed | Explanation |
| --- | --- | --- |
| 0 | There is no risk in the performance of this task | This customer is extremely capable of implement the most complex of systems |
| 1 | Low risk in the performance of this task | This customer has implemented complex systems in the past and has had minimal numbers of issues when implementing these systems |
| 2 | Moderate risk in the performance of this task | This customer has had some issues in the past when implementing complex systems. The customer has adequate controls and procedures in place that will help in the success of this implementation, but in the estimate of the SME and Architect services should engaged |
| 3 | Medium risk in the performance of this task | This customer has had numerous issues in the past at implementing complex systems or has no experience at implanting complex systems in the past. The customers controls and procedures are minimal or not followed |
| 4 | High risk in the performance of this task | This customer has never implemented a complex system or has been successful in implementing complex systems only when large amounts of services have been utilized. This customer has controls and procedures that are not sufficient to assure success |
| 5 | Exceptionally high risk in the performance of this task | This customer has never implemented a system of this complexity and/or does not have any controls and procedures to insure success. |

Finally, past history with similar product implementation must also be included in the risk assessment process. For instance, a customer who has a high number of problem reports open must be considered more risky that a customer who has not opened large numbers of such reports. Accordingly, in this illustrative embodiment, a third coefficient of risk is included that assesses historical risk $r_h$ associated with the customer. In one illustrative embodiment, this coefficient is based on the customer's last 24 months of problem report activity. Table 3 gives a historical risk coefficient.

TABLE 3

| Historical Risk Coefficient | Numbers of problem reports opened in the last 24 Months |
|---|---|
| 0 | 0–10 |
| 1 | 11–25 |
| 2 | 25–40 |
| 3 | 41–60 |
| 4 | 60–80 |
| 5 | Greater than 80 |

Note that if a critical Situation has occurred at this customer site in the last 24 months that could not be directly attributed to a product defect (in other words, the Critical Situation was caused by configuration error, programming error, procedural error, or other customer error), then the historical risk coefficient $r_h$ may automatically default to a 5.

Figure 2:
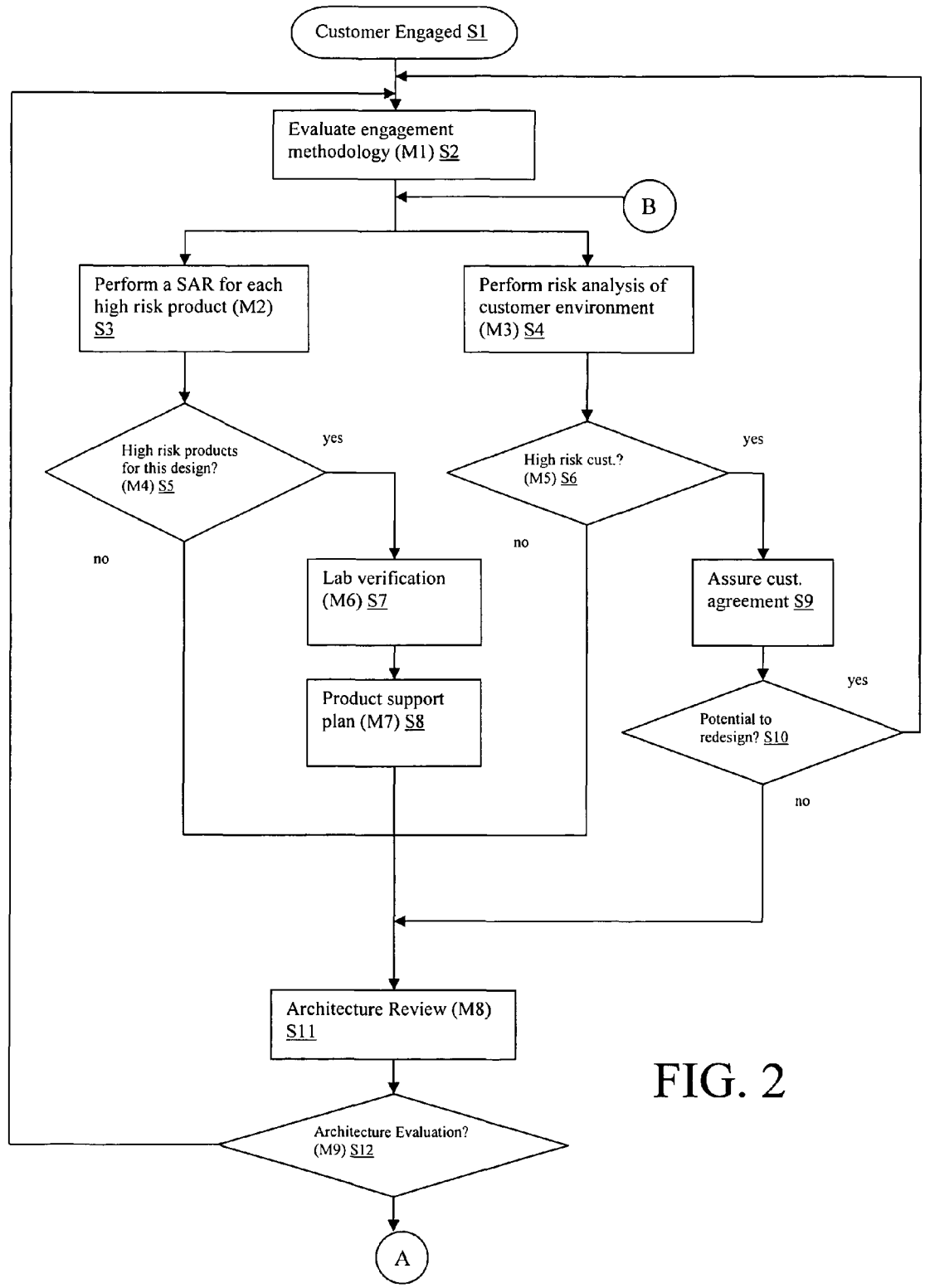
FIG. 2 depicts a flow chart of a first phase of a risk avoidance process in accordance with the present invention.
Figure 3:
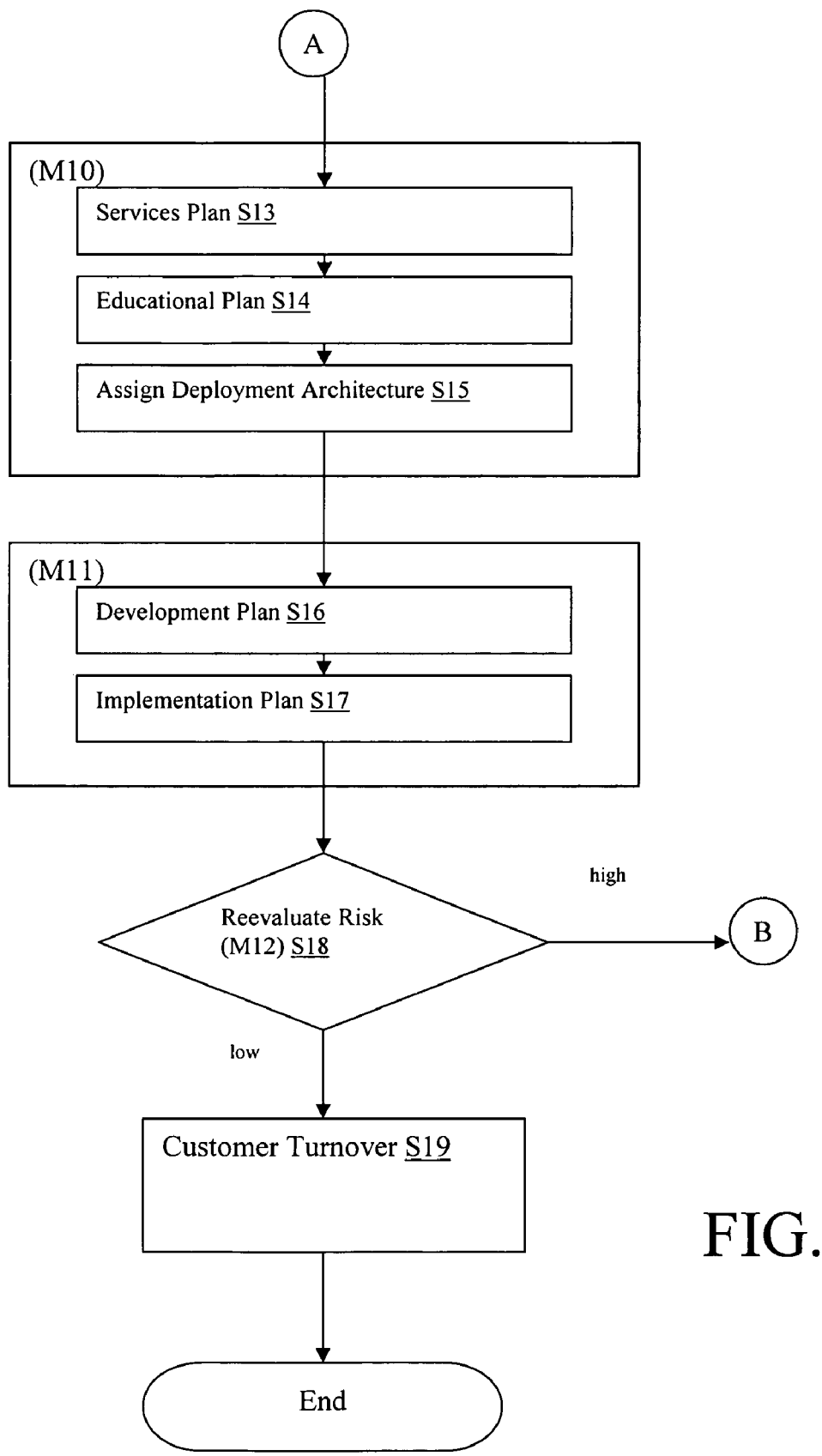
FIG. 3 depicts a flow chart of a second phase of a risk avoidance process in accordance with the present invention.
Figure 4:
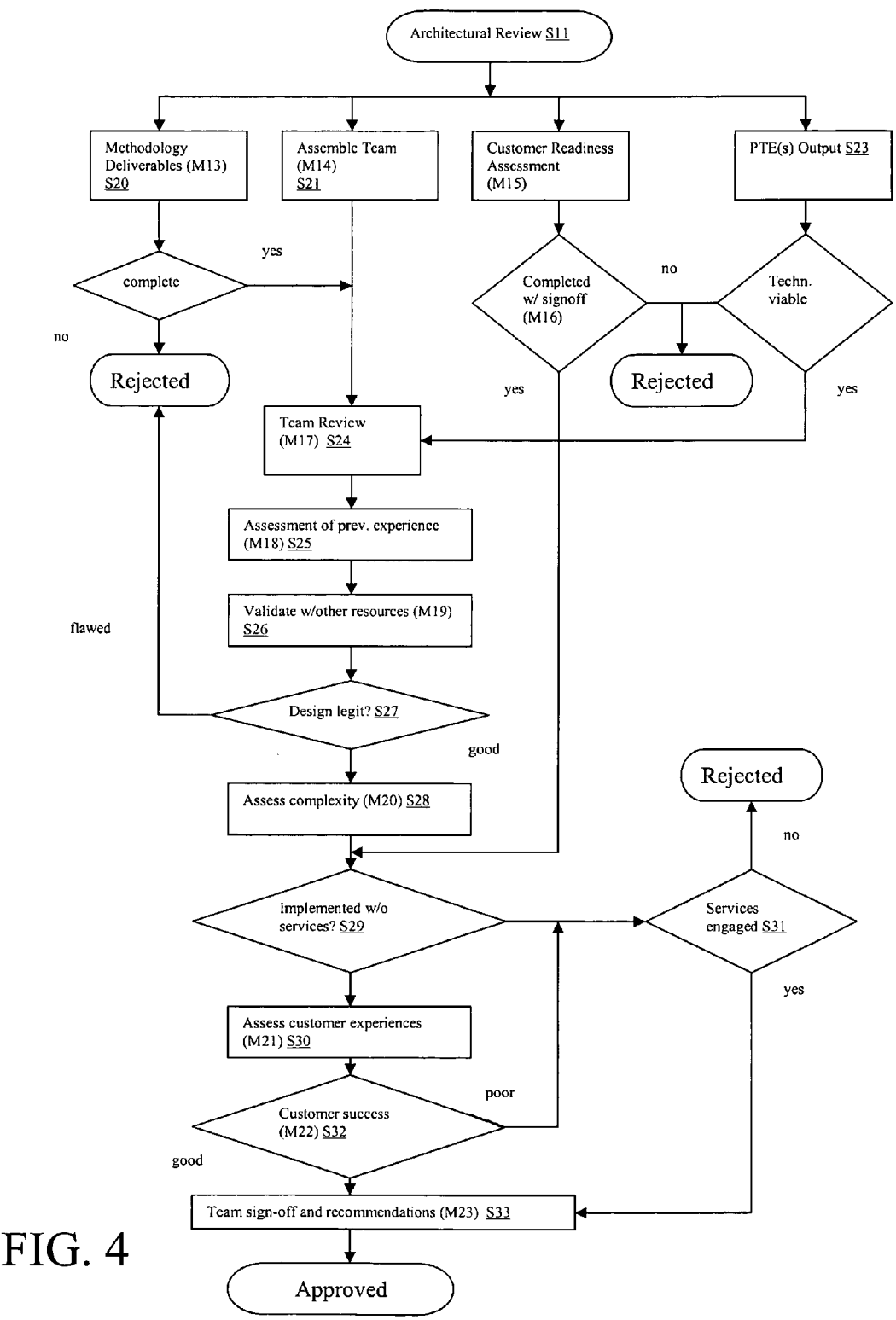
FIG. 4 depicts a flow chart of an architectural review process in accordance with the present invention.

FIGS. 2-4 describe a methodological analysis of an illustrative risk avoidance process 12 which can be applied to a customer solution 11. FIGS. 2 and 3 depict the generalized view of the risk avoidance process 12. FIG. 4 provides a more detailed overview of the Architectural Review shown in step S11. Various markers M are positioned throughout the process, at which a value for risk coefficients $r_d$ and $r_c$, are determined. In the example shown, risk avoidance process includes 23 markers M1 ... M23.

At the first step S1 of the risk avoidance process 12, the client is engaged. Next, at step S2, the engagement methodology is reviewed. At this point, all design methodology documentation is collected. Regardless of the methodology that is used, the documentation output of the design methodology must be collected for review. The quality of this documentation will certainly impact the process of the methodology, but lack of quality is not necessarily a disqualifier. However, in the event that no documentation is available or a design methodology was not followed, the reviewers who are following the risk avoidance process 12 should immediately score this solution design as "High Risk" and should proceed with extreme caution through the rest of the process. In any event, risk values $r_d[1]$ and $r_c[1]$ are determined for the first marker M1.

The next phase is the review phase and is significantly more complicated. It should be noted, that the team that is to perform the rest of the risk avoidance process should be selected prior to this phase.
1. The information technology architect who designed the system
2. Any technical specialist involved with producing the design
3. SME and Lab resources for each product in the design
4. Other project stakeholders
5. Other senior architects depending on complexity of the solution or profile of the customer.

At step S3, which corresponds with the second marker M2, a Product Technical Evaluation (PTE) should be produced for each high risk product or products that are known to be difficult to implement. PTE's in their simplest form are a check to make sure that all appropriate system requirements are in place prior to system implementation. Next, at step S5, which corresponds with marker M4, a determination is made whether any of the products are deemed to be high risk for this solution (i.e., there may be stable products that can still be high risk in a particular design and vice versa). If so, then further review will be necessary. If only one product is deemed high risk, the entire design should then be coded as High Risk.

Assuming that a product is deemed a high risk, the design, product requirements, etc., must be reviewed by the specific lab that is responsible for this product (step S7) which corresponds with marker M6. It is imperative that the technical sales people involved with constructing this design be present to represent the design to the lab. The architect who designed this solution is required to present this lab as well as the product technical specialists involved. Without these resources representing the design to the lab, it will be impossible to fully comprehend all of the functional and non-functional requirements.

Anytime a product has caused the design to be deemed High Risk, a product support plan must also be put into place prior to the sale of the solution or the deployment of a solution post sales, at step S8 (marker M7). The plan should include, but not be limited to, lab advocates who will take responsibility for lab/customer interaction with this product the following; a plan for what the development team will do for this customer to mitigate risk; names and contact specifics for local regional specialist who will be responsible for assuring customer success, etc.

At step S4, which corresponds with marker M3, a risk analysis of the customer environment should be performed. This is a part of the process that is typically overlooked. This is the point where an analysis of the customer's capability to implement such a solution should be done. Factors include the customer's ability to produce applications that utilize related software, whether the customer has appropriate operations procedures and development procedures to be able to implement appropriate best practices, etc.

Often (as much as 80% by some estimates), when a Critical Situation occurs, it is due to lack of good standard operating procedures on the part of the customer. Factors to consider include:

1. Is this customer a problem child? How many problem reports and Critical Situations has this customer been involved with?

2. Does this customer have a mature operations environment? Do they have standard operating procedures that are well documented and followed?

3. Does the customer use a code asset management environment?

4. Has the customer ever implemented something of the same scale and complexity as the proposed design?

Does the customer have a mature development staff? In particular, is the customer's development organization mature in the programming language and model that is being proposed? Many shops are very mature with COBOL and neophytes with Java. This can be problematic.

At step S6, which corresponds with marker M5, a determination is made whether the customer is a high-risk customer. If any aspect of the customer environment, which would impact this solution, is considered to be high risk, then the entire solution should be coded High Risk. In this case, the client agreement should be assured at step S9 and a determination should be made for whether there is a potential to re-design the solution at step S10. Steps S11 and S12, architectural review and evaluation, which correspond with markers M8 and M9, indicate the last steps in the review phase. Due to the complexity of an architectural review, the architecture review process will be described separately in FIG. 4.

The Plan/Revise phases of this methodology, shown in FIG. 3, are used to handle the evaluation of any plans that the pre-sales customer team has put in place to mitigate customer risk or any plans that have been put in place post sale. The purpose is not to create these plans but to review these plans to determine if these plans in anyway will change the risk level of this project(s).

Steps S13, S14 and S15 (marker M10) involve evaluating the education plan, the assignment of a deployment architect, and the services plan. Each can be taken into account when assessing the risk level of this project for this customer.

Steps S16 and S17 (marker M11) involve evaluating a development plan and an implementation plan, since the quality of these two plans can both decrease and increase the risk factor for this project. For instance, a well thought out plan that can be implemented in a straight forward manner should be considered in lowering the risk factor. Conversely, a poorly conceived or written plan would increase the risk factor.

At step S18 (marker M12), all of the participants should evaluate each of the risk values and any overall risk output (e.g., distribution) and decide a risk level for the project. The risk level is not meant to be a guarantee for this project, but rather, it is only a level of risk. However, any risk assignment above moderate risk should be reviewed by sales executives for acceptability. At step S19, assuming a low risk, the project is turned over to the customer.

FIG. 4 provides a more detailed overview of the Architecture Review (AR) process shown in step S11. An architectural review is a study of the proposed system looked at holistically. It is very possible that a system is designed using products that are well known and tried in the marketplace, yet the combination of products or the overall design of the system is flawed. The AR attempts to discover any potential flaws and alleviate them prior to customer turnover and implementation. The discovery phase is the point at which all architectural artifacts are collected for review. During this phase, any artifacts that should have been produced are assembled into consistent collections that will facilitate a trouble free review of the proposed design. Since projects vary in scope and complexity, it is understood that not all artifacts may have been produced. However, upon finding that necessary artifacts are missing, it is the responsibility of the SME's involved to request of the assigned technical team, the production of said artifacts in order to ensure completeness.

At S20 (marker M13), the methodology deliverables are evaluated. Note that since this part of the risk avoidance process 12 could optionally be a stand alone process, the data collection may be redundant, and already completed during the initial discover phase described in FIG. 2. At this point the artifacts of the design methodology for this project are collected. There are many design methodologies of various values used in architectural methodologies. Regardless of the methodology that is used, the minimum needs at this point include: use cases or proposed use explanations; business context (or business need); operational model; system model; and proposed "as built" configuration. If the methodology deliverables are not complete, the design should be rejected. If complete, the process flows to team review at step S24 (marker M17).

Step S21 (marker M14) involves assembling the team of architects and specialists. The team that will review this is comprised of SME's for the product sets as well as the customer assigned architects manager, the Principal Architect, and/or one or more senior qualified architects as need. At step S24, the team is reviewed.

Step S22 (marker M15) involves evaluation of the Customer Readiness Assessment (CRA), which is critical to the success of any implementation. The readiness assessment is a: "Framework to facilitate communications, set proper expectations, ownership and responsibilities, assess risk and issues, set a proper course of action to assure that the solution will work for the customer." Assuming the CRA is completed and signed off, the process flows to step S29. Otherwise, the design is rejected.

Step S23 obtains the PTE outputs, which are evaluated for technical viability. If not viable, the design is rejected. If viable, the process flows to step S24. Team review is a central effort important in this analysis. It is up to each team to determine the process of this review based on the specifics of the proposed design. Since each design will differ in many aspects, a team leader should be chosen from among the architect SME's assigned. The responsibility of the leader will be to assure that the analysis assignments are correctly assigned and that the assessment is carried out on a solution rather than product basis.

At step S25 (marker M18), an assessment of previous experience is determined. The assessment of risk is an assessment of the risk of the entire architectural design. It should be based on best practices, prior experience with a design of this nature, etc.

At step S26 (marker M19), the design is validated with other resources. There are many possible reference architectures. These should be checked against the proposed design. If the design is deemed flawed, the design is rejected.

At step S28 (marker M20), the team that is reviewing this design must make some assessments as to the complexity of this design. In particular, it is important to assess complexity in light of the implementer's abilities.

At step S29, a determination is made whether the design can be implemented without "services." If not, a determination is made at step S31 whether services have been engaged. If services are not required, then an assessment is made regarding customer experiences at steps S30 and S32 (markers M21 and 22). It is imperative to evaluate the implementer's ability to implement the proposed solution. Factors to consider include: the implementer's Code Asset Management process (CAM), the implementer's architecture design process; the implementer's turn over process; the implementer's development, quality assurance processes, and production processes and infrastructure; the implementer's skill level or ability to acquire and train skill; and the implementers operational processes and runtime skills.

Assuming the customer has a history of success, team sign-off and recommendations are made at step S33 (marker M23). This is generally the signoff of the experts. By way of signature, the experts are signifying either agreement or disagreement with this design.

In general, part or all of risk assessment system 10 may be implemented on a computer system, e.g., a desktop, a laptop, a workstation, handheld, etc. Such a computer system could be implemented as part of a client and/or a server and include a processor, input/output (I/O), memory, and bus. The processor may comprise a single processing unit, or be distributed across one or more processing units in one or more locations, e.g., on a client and server. Memory may comprise any known type of data storage and/or transmission media, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

I/O may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc.

Access to such a computer system may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

Moreover, it should be appreciated that the teachings of the present invention could be offered as a business method, e.g., on a subscription or fee basis. For example, a computer comprising a risk assessment system could be created, maintained and/or deployed by a service provider that offers the functions described herein for customers. That is, a service provider could offer to provide risk assessment and avoidance as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part of all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A risk assessment system for implementing a customer solution, comprising:
    a system stored in a memory for assigning a first risk value to a first risk coefficient associated with a design related process at each of the plurality of markers, wherein the first risk value is based on a set of first risk coefficient guidelines;
    a system stored in the memory for assigning a second risk value to a second risk coefficient associated with a customer ability at each of the plurality of markers, wherein the second risk value includes at least the customer's ability to implement a customer solution and is based on a set of second risk coefficient guidelines; and
    a system stored in the memory for assigning a third risk value to a third risk coefficient associated with a customer history, wherein the third risk value is based on a set of third risk coefficient guidelines and the customer history includes at least a record of past problems associated with product implementation.

2. The risk assessment system of claim 1, further comprising a risk value processing system stored in the memory for generating an overall risk of the customer solution based on the first, second and third risk coefficients.

3. The risk assessment system of claim 2, wherein the overall risk comprises a distribution.

4. The risk assessment system of claim 3, wherein the distribution is a Weibull distribution of failure rates.

5. The risk assessment system of claim 1, further comprising a cost calculation system stored in the memory that calculates a cost based on the first, second and third risk coefficients.

6. A computer program product stored on a computer usable storage medium for performing a risk assessment of a customer solution, comprising:
    program code configured for representing a risk avoidance process for implementing a customer solution, wherein the risk avoidance process includes a plurality of markers where a first, a second, and a third risk values are assessed for the entire risk avoidance process;
    program code configured for assigning the first risk value to a first risk coefficient associated with a design related process at each of the plurality of markers, wherein the first risk value is based on a set of first risk coefficient guidelines;
    program code configured for assigning the second risk value to a second risk coefficient associated with a customer ability at each of the plurality of markers, wherein the second risk value includes at least the customer's ability to implement the customer solution and is based on a set of second risk coefficient guidelines; and
    program code configured for assigning the third risk value to a third risk coefficient associated with a customer history, wherein the third risk value is based on a set of third risk coefficient guidelines and the customer history includes at least a record of past problems associated with product implementation.

7. The computer program product of claim 6, further comprising program code configured for generating an overall risk of the customer solution based on the first, second and third risk coefficients.

8. The computer program product of claim 7, wherein the overall risk comprises a distribution.

9. The computer program product of claim 6, further comprising program code configured for calculating a cost based on the first, second and third risk coefficients.

10. The computer program product of claim 6, wherein the risk avoidance process includes a discovery phase, a review phase, a plan/revise phase, and a decide phase.

11. The computer program product of claim 6, wherein the risk avoidance process includes an architectural review phase that examines customer capabilities, design legitimacy, complexity, and customer history.

12. A method of performing a risk assessment of a customer solution, comprising:
providing a risk avoidance process for implementing a customer solution, wherein the risk avoidance process includes a plurality of markers where a first, a second, and a third risk values are assessed for the entire risk avoidance process;
using a processor, assigning a first risk value to the first risk coefficient associated with a design related process at each of the plurality of markers, wherein the first risk value is based on a set of first risk coefficient guidelines;
using the processor, assigning a second risk value to the second risk coefficient associated with a customer ability at each of the plurality of markers, wherein the second risk value includes at least the customer's ability to implement the customer solution and is based on a set of second risk coefficient guidelines; and
using the processor, assigning a third risk value to the third risk coefficient associated with a customer history, wherein the third risk value is based on a set of third risk coefficient guidelines and the customer history includes at least a record of past problems associated with product implementation.

13. The method of claim 12, further comprising the step of generating an overall risk of the customer solution based on the first, second and third risk coefficients.

14. The method of claim 13, wherein the overall risk comprises a distribution.

15. The method of claim 12, further comprising the step of calculating a cost based on the first, second and third risk coefficients.

16. The method of claim 12, wherein the risk avoidance process includes a discovery phase, a review phase, a plan/revise phase, and a decide phase.

17. The method of claim 12, wherein the risk avoidance process includes an architectural review phase that examines customer capabilities, design legitimacy, complexity, and customer history.

18. A method for deploying an application for performing a risk assessment of a customer solution, comprising:
providing a computer infrastructure that carries out:
providing a risk avoidance process for implementing a customer solution, wherein the risk avoidance process includes a plurality of markers where a first, a second, and a third risk values are assessed for the entire risk avoidance process;
assigning, using a processor, a first risk value to the first risk coefficient associated with a design related process at each of the plurality of markers, wherein the first risk value is based on a set of first risk coefficient guidelines;
assigning, using a processor, a second risk value to the second risk coefficient associated with a customer ability at each of the plurality of markers, wherein the second risk value includes at least the customer's ability to implement the customer solution and is based on a set of second risk coefficient guidelines; and
assigning, using a processor, a third risk value to the third risk coefficient associated with a customer history, wherein the third risk value is based on a set of third risk coefficient guidelines and the customer history includes at least a record of past problems associated with product implementation.

* * * * *